(12) United States Patent
Lee et al.

(10) Patent No.: US 12,129,967 B2
(45) Date of Patent: Oct. 29, 2024

(54) APPARATUS AND METHOD FOR CONTROLLING FUEL TANK

(71) Applicant: HYUNDAI MOBIS Co., Ltd., Seoul (KR)

(72) Inventors: Yong Hee Lee, Yongin-si (KR); Se Hoon Song, Yongin-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/714,680

(22) Filed: Apr. 6, 2022

(65) Prior Publication Data
US 2022/0364682 A1 Nov. 17, 2022

(30) Foreign Application Priority Data
May 11, 2021 (KR) .................. 10-2021-0060591

(51) Int. Cl.
*F17C 13/04* (2006.01)
*F17C 7/00* (2006.01)
*F17C 13/02* (2006.01)

(52) U.S. Cl.
CPC ............. *F17C 13/04* (2013.01); *F17C 7/00* (2013.01); *F17C 13/026* (2013.01); *F17C 2205/0391* (2013.01); *F17C 2221/012* (2013.01); *F17C 2227/048* (2013.01); *F17C 2250/0439* (2013.01); *F17C 2260/042* (2013.01); *F17C 2270/0184* (2013.01)

(58) Field of Classification Search
CPC ....... F01M 21/0224; F17C 13/04; F17C 7/00; F17C 13/026; F17C 2205/0391; F17C 2221/012; F17C 2227/048; F17C 2250/0439; F17C 2260/042; F17C 2270/0184; F17C 2201/019; F17C 2201/0185; F17C 2203/0629; F17C 2201/018; B60P 3/243; B60P 3/246
USPC .............................. 141/21; 137/572
See application file for complete search history.

(56) References Cited

U.S. PATENT DOCUMENTS

| | | | | |
|---|---|---|---|---|
| 3,109,294 A | * | 11/1963 | Messer | F17C 3/025 220/560.04 |
| 3,115,984 A | * | 12/1963 | Henry | B63B 25/08 220/560.04 |
| 3,383,002 A | | 5/1968 | Fleming et al. | |
| 5,411,058 A | * | 5/1995 | Welsh | F02D 19/0678 137/574 |
| 5,603,360 A | | 2/1997 | Teel | |

(Continued)

FOREIGN PATENT DOCUMENTS

| | | |
|---|---|---|
| DE | 100 27 619 A1 | 12/2001 |
| EP | 3 708 897 A1 | 9/2020 |

OTHER PUBLICATIONS

Extended European Search Report issued in corresponding European Patent Application No. 22166639.9 dated Sep. 23, 2022.

*Primary Examiner* — Timothy L Maust
*Assistant Examiner* — Christopher M Afful
(74) *Attorney, Agent, or Firm* — Morgan, Lewis & Bockius LLP

(57) ABSTRACT

An apparatus for controlling a fuel tank according to an embodiment of the present disclosure may include a fuel tank having a plurality of volumes, and a controller that controls a charging state of a fuel charged in the fuel tank and selectively controls use of the fuel charged in the plurality of volumes based on an amount of the fuel used and a state of the fuel tank.

12 Claims, 6 Drawing Sheets

(56) References Cited

U.S. PATENT DOCUMENTS

| | | | | |
|---|---|---|---|---|
| 7,988,926 | B2* | 8/2011 | Schmidt-Ihn | C01B 3/0005 |
| | | | | 422/198 |
| 10,174,882 | B2* | 1/2019 | Cort | F17C 5/06 |
| 2005/0022896 | A1* | 2/2005 | Cnossen | F24D 3/1033 |
| | | | | 141/67 |
| 2017/0145961 | A1* | 5/2017 | Myers | B61D 17/00 |
| 2020/0270117 | A1* | 8/2020 | Williams | B67D 7/061 |

\* cited by examiner

| | TEMPERATURE SENSOR 1(°C) | TEMPERATURE SENSOR 2(°C) | REFERENCE TEMPERATURE(°C) |
|---|---|---|---|
| R1 (1 SECOND) | 22 | 29 | 30 |
| R2 (1.01 SECOND) | 24 | 29 | 31 |
| T3 (1.02 SECOND PREDICTION) | 23.8 | 29 | 30.9 |
| R3 (1.02 SECONDS) | 22 | 30 | 32 |
| d3 (1.02 SECONDS ERROR) | 1.2 | −1 | −1.1 |
| ... | ... | ... | ... |
| T2000 (1+0.01*2000=201 SECONDS PREDICTION) | 27.5 | 30 | 37 |
| R2000 (201 SECONDS) | 26 | 33 | 35 |
| d2000 (201 SECONDS ERROR) | 1.5 | −3 | +2 |
| T2001 (201.01 SECONDS PREDICTION) | 26±1.5 | 33±3 | 35±2 |
| R2001 (201.01 SECONDS) | 57 | 32 | 36 |

Fig.4

APPARATUS AND METHOD FOR CONTROLLING FUEL TANK

CROSS-REFERENCE TO RELATED APPLICATION

This application claims the benefit of priority to Korean Patent Application No. 10-2021-0060591, filed in the Korean Intellectual Property Office on May 11, 2021, the entire contents of which are incorporated herein by reference.

TECHNICAL FIELD

The present disclosure relates to an apparatus and method for controlling a fuel tank.

BACKGROUND

In general, examples of a method of storing hydrogen in a hydrogen tank include a high-pressure compression method, a liquid hydrogen storage method, and a chemical hydrogen storage method.

In the case of fuel cell vehicles, hydrogen is stored in a hydrogen tank (cylinder) that may withstand high pressure using a high-pressure compression method.

Meanwhile, a temperature sensor is provided in the hydrogen tank to measure a temperature inside the hydrogen tank from a main inlet valve side, and a thermally activated pressure relief device (TPRD) operates as a fail-safety and opens the main inlet valve when the temperature reaches about 110 degrees Celsius.

However, the hydrogen tank made of a metal has hydrogen embrittlement, and thus the hydrogen penetrates into the metal, moves to tips of cracks, and propagates the cracks. Thus, the hydrogen tank may be easily broken.

Charging of the hydrogen tank uses an adiabatic compression method, and when the temperature increases while the hydrogen is compressed and then exceeds 80 degrees Celsius, it may be determined that a current state is dangerous. In the hydrogen tank according to the related art, a pressure and the temperature are sensed at one location of the valve, and thus there is a problem of reliability.

SUMMARY

The present disclosure has been made to solve the above-mentioned problems occurring in the prior art while advantages achieved by the prior art are maintained intact.

An aspect of the present disclosure provides an apparatus and method for controlling a fuel tank, which may improve safety by protecting residual hydrogen of another volume on the basis of valve adjustment in a fail safety situation while hydrogen stored in one volume is used.

The technical aspects of the present disclosure are not limited to the aspects described above, and those skilled in the corresponding art will clearly understand other technical aspects not described from the following descriptions.

According to an aspect of the present disclosure, there is provided an apparatus for controlling a fuel tank, the apparatus including the fuel tank having a plurality of volumes, and a controller that controls a charging state of a fuel charged in the fuel tank and selectively controls use of the fuel charged in the plurality of volumes based on an amount of the fuel used or a state of the fuel tank.

In one embodiment, the fuel tank may include a chamber including a first volume on one side and a second volume on the other side with respect to a partition wall, a first valve that is provided on the one side of the chamber and adjusts opening or closing of the first volume, a second valve that is provided on the other side of the chamber and adjusts opening or closing of the second volume, and a third valve that is provided in the partition wall and adjusts opening or closing for communication between the first volume and the second volume.

In one embodiment, when a difference between pressures of the first volume and the second volume is within a predetermined allowable range, the controller may control the opening or closing of the third valve to perform adjustment so that the pressures of the first volume and the second volume become equal to each other.

In one embodiment, when the fuel is charged in the fuel tank, in a state in which the third valve is opened, the controller may control the first valve to be opened and the second valve to be closed or controls the first valve to be closed and the second valve to be opened.

In one embodiment, after charging the fuel in the fuel tank, the controller may control the first valve, the second valve, and the third valve to be closed.

In one embodiment, when the fuel charged in the fuel tank is used, the controller may perform control so that the fuel charged in the first volume, the fuel charged in the second volume, or the fuel charged in a third volume formed by allowing the first volume and the second volume to communicate with each other are selectively used.

In one embodiment, the controller may control the first valve to be opened and the second valve and the third valve to be closed to use the fuel charged in the first volume, control the first valve and the third valve to be closed and the second valve to be opened to use the fuel charged in the second volume, and control the first valve and the third valve to be opened and the second valve to be closed or control the second valve and the third valve to be opened and the first valve to be closed to use the fuel charged in the third volume.

In one embodiment, the controller may control the fuel charged in the third volume to be used to increase fuel output while the fuel charged in the first volume or the fuel charged in the second volume is used.

In one embodiment, the controller may control the fuel charged in the first volume, the second volume, or the third volume to be selectively used based on an internal temperature value of the first volume or an internal temperature value of the second volume.

In one embodiment, the controller may determine whether the internal temperature value of the first volume or the internal temperature value of the second volume satisfies a predetermined minimum and maximum value, a predetermined safe temperature value, and a predetermined prediction value when the fuel charged in the fuel tank is used.

In one embodiment, the controller may determine an occurrence frequency when the internal temperature value of the first volume or the internal temperature value of the second volume satisfies the predetermined minimum and maximum value and the predetermined safe temperature value but does not satisfy the predetermined prediction value when the fuel charged in the fuel tank is used.

According to another aspect of the present disclosure, there is provided a method of controlling a fuel tank, the method including controlling a charging state of a fuel charged in the fuel tank which includes a plurality of volumes, and selectively controlling use of the fuel charged in the plurality of volumes based on an amount of the fuel used or a state of the fuel tank.

In one embodiment, the controlling of the charging state of the fuel may include adjusting opening or closing of a first volume through a first valve provided on one side of a chamber including the first volume on one side and a second volume on the other side with respect to a partition wall, adjusting opening or closing of the second volume through a second valve provided on the other side of the chamber, and adjusting opening or closing for communication between the first volume and the second volume through a third valve provided in the partition wall.

In one embodiment, the controlling of the charging state of the fuel may include controlling the opening or closing of the third valve to perform adjustment so that pressures of the first volume and the second volume become equal to each other when a difference between the pressures of the first volume and the second volume is within a predetermined allowable range.

In one embodiment, the controlling of the charging state of the fuel may include controlling the first valve to be opened and the second valve to be closed or controlling the first valve to be closed and the second valve to be opened in a state in which the third valve is opened to charge the fuel in the fuel tank.

In one embodiment, the controlling of the charging state of the fuel charged in the fuel tank forming the plurality of volumes may include controlling the first valve, the second valve, and the third valve to be closed after charging the fuel in the fuel tank.

In one embodiment, the selectively controlling of the use of the fuel charged in the plurality of volumes based on the amount of the fuel used or the state of the fuel tank may include performing control so that the fuel charged in the first volume, the fuel charged in the second volume, or the fuel charged in a third volume formed by allowing the first volume and the second volume to communicate with each other are selectively used.

In one embodiment, the selectively controlling of the use of the fuel charged in the plurality of volumes based on the amount of the fuel used or the state of the fuel tank may include controlling the first valve to be opened and the second valve and the third valve to be closed to use the fuel charged in the first volume, controlling the first valve and the third valve to be closed and the second valve to be opened to use the fuel charged in the second volume, and controlling the first valve and the third valve to be opened and the second valve to be closed or controlling the second valve and the third valve to be opened and the first valve to be closed to use the fuel charged in the third volume.

In one embodiment, the selectively controlling of the use of the fuel charged in the plurality of volumes based on the amount of the fuel used or the state of the fuel tank may include controlling the fuel charged in the third volume to be used to increase fuel output fuel while the fuel charged in the first volume or the fuel charged in the second volume is used.

In one embodiment, the selectively controlling of the use of the fuel charged in the plurality of volumes based on the amount of the fuel used or the state of the fuel tank may include controlling the fuel charged in the first volume, the second volume, or the third volume to be selectively used based on an internal temperature value of the first volume or an internal temperature value of the second volume.

In one embodiment, the selectively controlling of the use of the fuel charged in the plurality of volumes based on the amount of the fuel used or the state of the fuel tank may include determining whether the internal temperature value of the first volume or the internal temperature value of the second volume satisfies a predetermined minimum and maximum value, a predetermined safe temperature value, and a predetermined prediction value when the fuel charged in the fuel tank is used.

In one embodiment, the selectively controlling of the use of the fuel charged in the plurality of volumes based on the amount of the fuel used or the state of the fuel tank may include determining an occurrence frequency when the internal temperature value of the first volume or the internal temperature value of the second volume satisfies the predetermined minimum and maximum value and the predetermined safe temperature value but does not satisfy the predetermined prediction value when the fuel charged in the fuel tank is used.

BRIEF DESCRIPTION OF THE DRAWINGS

The above and other objects, features and advantages of the present disclosure will be more apparent from the following detailed description taken in conjunction with the accompanying drawings:

FIG. 4 is a view for describing a sensor check in the apparatus for controlling a fuel tank according to an embodiment of the present disclosure.

DETAILED DESCRIPTION

Figure 1:
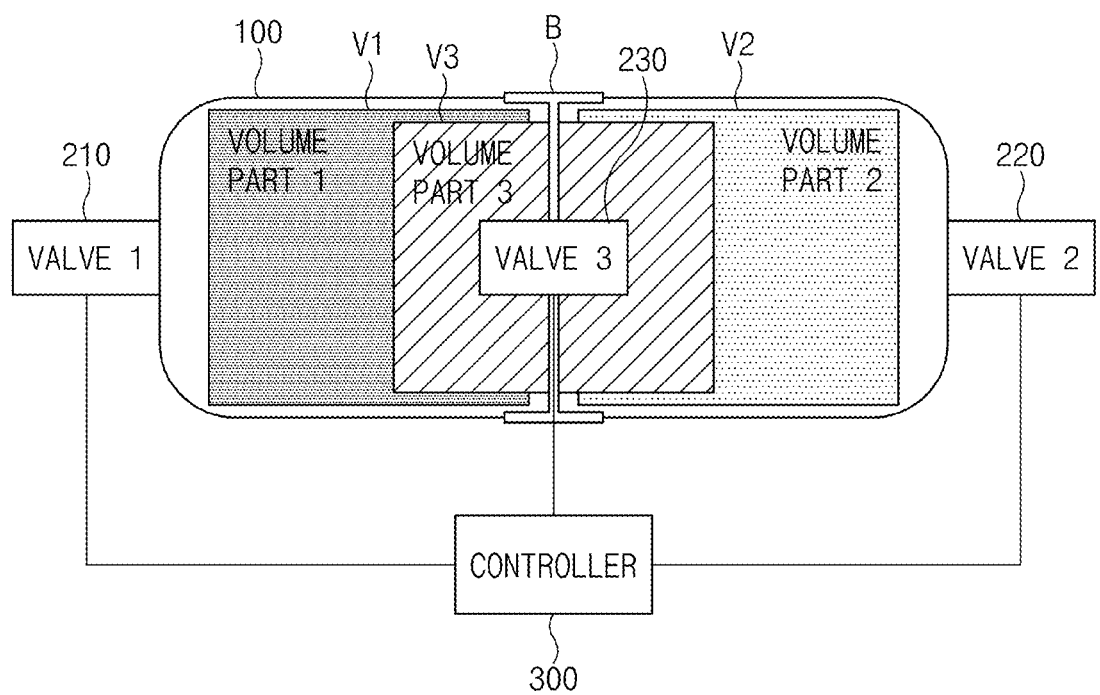
FIG. 1 is a view illustrating an apparatus for controlling a fuel tank according to an embodiment of the present disclosure.

Hereinafter, various embodiments of the present disclosure will be described with reference to the accompanying drawings. However, it should be understood that the present disclosure is not limited to specific embodiments and includes various modifications, equivalents, and/or alternatives of the embodiments of the present disclosure.

It should be understood that various embodiments of the present specification and terms used herein are not intended to limit the technical features described in the present specification to specific embodiments and include various modifications, equivalents, or alternatives of the corresponding embodiment.

In connection with the description of the drawings, similar or related components may be designated by similar reference numerals. A singular form of a noun corresponding to an item may include one or more of items unless the relevant context clearly indicates otherwise.

In the present specification, phrases such as "A or B," "at least one of A and B," "at least one of A or B," "A, B, or C," "at least one of A, B, and C," and "at least one of A, B, or C" may include any one of the items listed together in a corresponding one of the phrases or all possible combinations thereof.

Such terms as "first" and "second" or "1st" and "2nd" may be used to simply distinguish a corresponding component from another corresponding component, and does not limit the components in other aspects (for example, importance or order). When it is referenced that a component (for example, a first component) is "coupled with" or "connected with" another component (for example, a second component) with or without the term "operatively" or "communicatively", this means that the component may be connected with the another component directly (for example, in a wired manner), wirelessly, or via a third component.

Various embodiments of the present specification may be implemented by software (for example, a program) including one or more instructions stored in a storage medium (for example, an internal memory or an external memory) that may be read by a machine. For example, the machine may call at least one instruction among one or more instructions stored in a storage medium and may execute the instruction. This enables at least one function to be performed according to the at least one called instruction. The one or more instructions may include a code that is made by a compiler or a code that may be executed by an interpreter.

The storage medium that may be read by the machine may be provided in a form of a non-transitory storage medium. Here, the "non-transitory storage medium" merely means that the storage medium is a tangible device and does not include a signal (for example, an electromagnetic wave), and with regard to the term, a case in which data are semi-permanently stored in the storage medium and a case in which data are temporarily stored in the storage medium are not distinguished from each other.

According to one embodiment, methods according to various embodiments disclosed in the present specification may be provided to be included in a computer program product. The computer program product may be traded between sellers and buyers as a product. The computer program product may be distributed in a form of a storage medium that may be read by a device (for example, a compact disk read only memory (CD-ROM)) or may be distributed (for example, downloaded or uploaded) through an application store or directly or online between two user devices. When the computer program product is distributed online, at least a part of the computer program product may be temporarily stored or temporarily generated in a machine-readable storage medium such as a memory of a server of a manufacturer, a server of an application store, or a relay server.

According to various embodiments, respective components (for example, modules or programs) of the above-described components may include one or a plurality of entities, and some of the plurality of entities may be disposed to be separated from the other components.

According to various embodiments, one or more components or operations among the above-described components may be omitted or one or more other components or operations may be added.

Alternatively or additionally, the plurality of components (for example, modules or programs) may be integrated into one component. In this case, the integrated component may perform one or more functions of respective components of the plurality of components in a manner that is the same as or similar to the functions performed by the corresponding component among the plurality of components before the integration.

According to various embodiments, operations performed by modules, programs, or other components may be executed sequentially, parallelly, repeatedly, or heuristically, one or more of the operations may be executed in a different order or omitted, or one or more other operations may be added.

Figure 2:
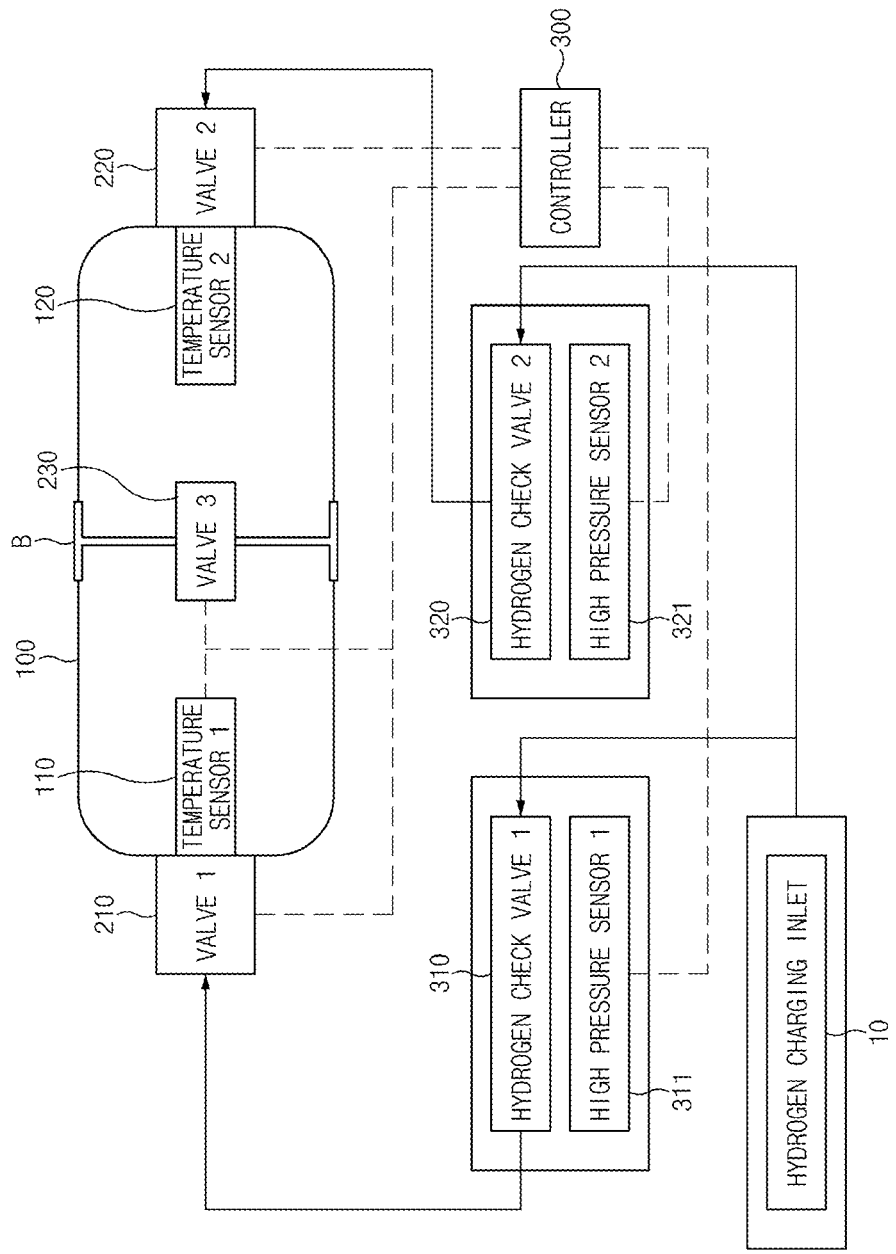
FIG. 2 is a view for describing charging of hydrogen in a fuel tank according to an embodiment of the present disclosure.

FIG. 1 is a view illustrating an apparatus for controlling a fuel tank according to an embodiment of the present disclosure, and FIG. 2 is a view for describing charging of hydrogen in a fuel tank according to an embodiment of the present disclosure.

Referring to FIGS. 1 and 2, the apparatus for controlling a fuel tank according to an embodiment of the present disclosure may include a fuel tank forming a plurality of volumes and a controller 300 that controls a charging state of a fuel charged in the fuel tank and selectively controls usage of the fuel charged in the fuel tank.

For example, the controller 300 may include a hybrid management unit.

The fuel tank may include a chamber 100, a temperature sensor 1 110, a temperature sensor 2 120, a valve 1 210, a valve 2 220, a valve 3 230, a high pressure sensor 1 311, and a high pressure sensor 2 321.

The chamber 100 may be divided into a volume part 1 V1 and a volume part 2 V2 having a predetermined volume with respect to a partition wall "B" provided therein.

For reference, a material of the partition wall "B" may be a metal capable of withstanding high pressure.

The temperature sensor 1 110 may measure an internal temperature of the volume part 1 V1, and the temperature sensor 2 120 may measure an internal temperature of the volume part 2 V2.

The valve 1 210 may be provided on one side of the chamber 100 to adjust opening or closing of the volume part 1 V1, the valve 2 220 may be provided on the other side of the chamber 100 to adjust opening or closing of the volume part 2 V2, and the valve 3 230 may be provided in the partition wall "B" to adjust opening or closing for communication between the volume part 1 V1 and the volume part 2 V2.

For reference, the valve 1 210, the valve 2 220, and the valve 3 230 may use solenoid valves, and in particular, the valve 3 230 may use a valve that may adjust an opening rate.

The high pressure sensor 1 311 may measure an internal pressure of the volume part 1 V1, and the high pressure sensor 2 321 may measure an internal pressure of the volume part 2 V2.

Referring to FIG. 2, to charge hydrogen in the chamber 100, the controller 300 may control the valve 1 210 to be opened, the valve 2 220 to be closed, and the valve 3 230 to be opened, and when the hydrogen is injected into a hydrogen charging inlet 10, a hydrogen check valve 1 310 is opened, and thus the hydrogen may be charged into the chamber 100 through the volume part 1 V1.

Alternatively, the controller 300 may control the valve 1 210 to be closed, the valve 2 220 to be opened, and the valve 3 230 to be opened, and when the hydrogen is injected into the hydrogen charging inlet 10, a hydrogen check valve 2 320 is opened, and thus the hydrogen may be charged into the chamber 100 through the volume part 2 V2.

When it is identified through the high pressure sensor 1 311 or the high pressure sensor 2 321 that an interior of the chamber 100 has a predetermined pressure value, the controller 300 may determine that the hydrogen is completely charged and control the valve 1 210, the valve 2 220, and the valve 3 230 to be closed. Next, the controller 300 may identify the internal pressure of the volume part 1 V1 through the high pressure sensor 1 311 and may identify the internal pressure of the volume part 2 V2 through the high pressure sensor 2 321.

For example, the controller 300 may determine that the hydrogen is completely charged when the internal pressure of the chamber 100 is 700 bar through the high pressure sensor 1 311 or the high pressure sensor 2 321 and may determine that the hydrogen is finally and completely charged when it is identified through the high pressure sensor 1 311 that the internal pressure of the volume part 1 V1 is 700 bar and it is identified through the high pressure sensor 2 321 that the internal pressure of the volume part 2 V2 is 700 bar.

Thus, when the hydrogen is completely charged in the chamber 100, the internal pressures of the volume part 1 V1, the volume part 2 V2, and the volume part 3 V3 may become equal to each other.

Meanwhile, in a process of manufacturing the chamber 100, volumes of the volume part 1 V1 and the volume part 2 V2 may be different from each other, and accordingly, a difference between the internal pressures of the volume part 1 V1 and the volume part 2 V2 may occur.

When the difference between the internal pressures of the volume part 1 V1 and the volume part 2 V2 is within a predetermined allowable range, the valve 3 230 may be opened so that the pressures of the volume part 1 V1 and the volume part 2 V2 may become equal to each other.

For example, when the chamber 100 is manufactured with the volume of the volume part 1 V1 of 60 liters and the volume of the volume part 2 V2 of 40 liters, and a difference between the internal pressures of the volume part 1 V1 and the volume part 2 V2 is 13 bar after the hydrogen is completely charged, the opening rate of the valve 3 230 may be adjusted to allow the hydrogen to communicate between the volume part 1 V1 and the volume part 2 V2, and thus the pressures of the hydrogen in the volume part 1 V1 and the volume part 2 V2 may become equal to each other.

Meanwhile, when the difference between the internal pressures of the volume part 1 V1 and the volume part 2 V2 after the hydrogen is completely charged exceeds the predetermined allowable range, it may be determined that a fault occurs in the chamber 100.

Figure 3:
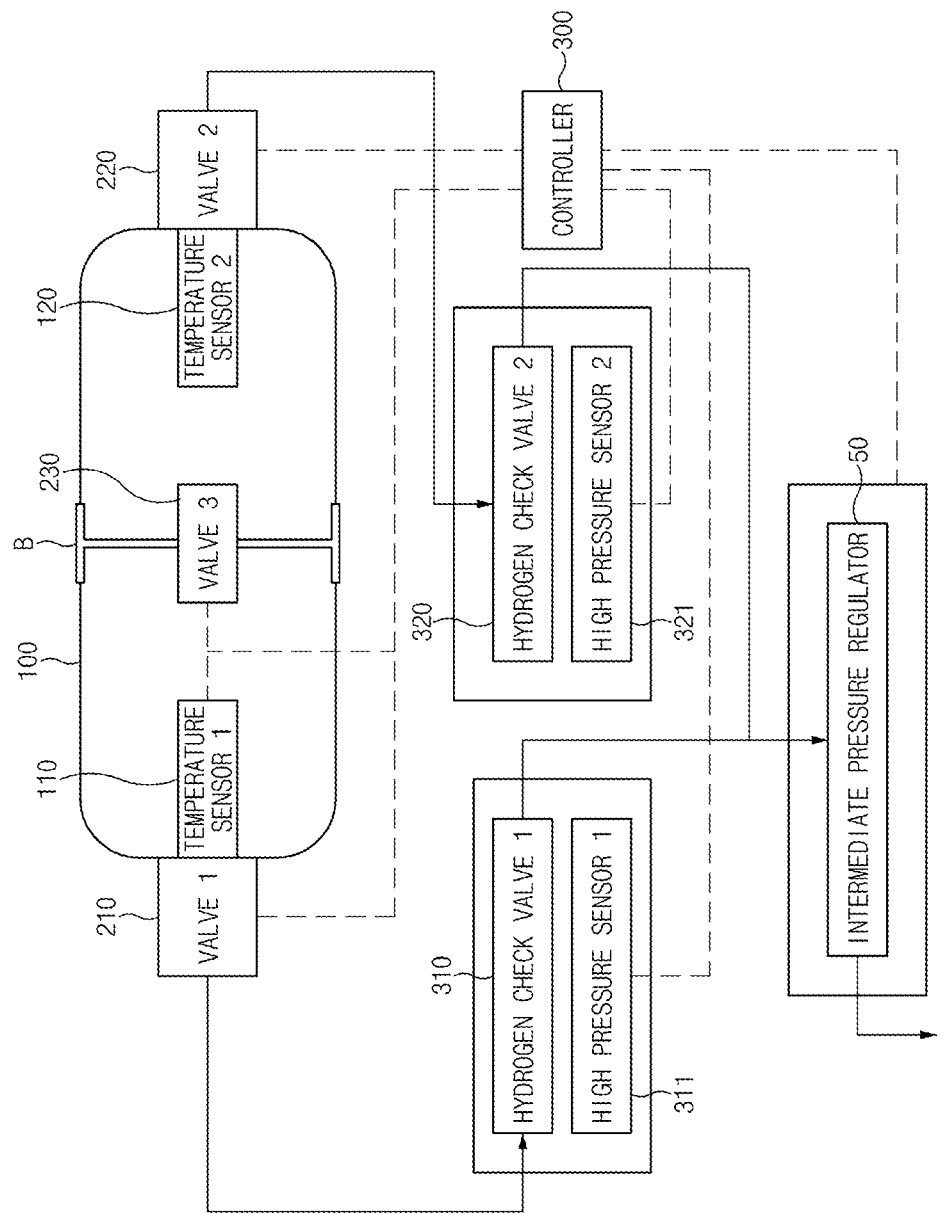
FIG. 3 is a view for describing use of the hydrogen charged in the fuel tank according to an embodiment of the present disclosure.

FIG. 3 is a view for describing use of the hydrogen charged in the fuel tank according to an embodiment of the present disclosure.

To use the hydrogen charged in the chamber 100, the controller 300 may identify a driving intention of a vehicle driver to control the hydrogen of the volume part 1 V1, the hydrogen of the volume part 2 V2, or the hydrogen of the volume part 3 V3 formed by the volume part 1 V1 and the volume part 2 V2 communicating with each other to be used.

The controller 300 may identify the driving intention using a pedal value, a vehicle speed, an acceleration sensor, and the like to determine whether an instantaneous high output is required, a stable constant output is required, or no output is required due to deceleration through braking, so as to control opening or closing of the valve 1 210, the valve 2 220, or the valve 3 230 so that use of the hydrogen in the volume part 1 V1, the volume part 2 V2, or the volume part 3 V3 is selected.

In addition, the controller 300 may selectively control the opening or closing of the valve 1 210, the valve 2 220, or the valve 3 230 on the basis of the internal pressures of the volume part 1 V1 and the volume part 2 V2 and the internal temperatures measured through the temperature sensor 1 110 and the temperature sensor 2 120.

Referring to FIG. 3, to use the hydrogen of the volume part 1 V1, the valve 1 210 may be opened, and the valve 2 220 and the valve 3 230 may be closed, and the hydrogen of the volume part 1 V1 may be adjusted to a pressure suitable to be supplied to the stack at an intermediate pressure regulator 50 via the hydrogen check valve 1 310 and then supplied to the stack.

For example, by identifying the driving intention of the vehicle driver, the hydrogen of the volume part 1 V1 may be controlled to be used under constant power and braking conditions.

To use the hydrogen of the volume part 2 V2, the valve 2 220 may be opened, and the valve 1 210 and the valve 3 230 may be closed, and the hydrogen of the volume part 2 V2 may be adjusted to a pressure suitable to be supplied to the stack at the intermediate pressure regulator 50 via the hydrogen check valve 2 320 and then supplied to the stack.

When the hydrogen of the volume part 1 V1 is not available because of an error occurring in the volume part 1 V1, for example, an increase in the internal pressure or an increase in the internal temperature of the volume part 1 V1, the hydrogen of the volume part 2 V2 may be controlled to be used.

In addition, after the hydrogen of the volume part 1 V1 or the volume part 2 V2 is used, a difference between the pressures of the volume part 1 V1 and the volume part 2 V2 may occur according to a usage amount. In this case, the opening rate of the valve 3 230 may be adjusted to allow the hydrogen to communicate between the volume part 1 V1 and the volume part 2 V2, and thus the internal pressures of the volume part 1 V1 and the volume part 2 V2 may be adjusted to become equal to each other.

To use the hydrogen of the volume part 2 V3, the valve 1 210 and the valve 3 230 may be opened, and the valve 2 220 may be closed or the valve 2 220 and the valve 3 230 may be opened and the valve 1 210 may be closed, and the hydrogen of the volume part 3 V3 may be adjusted to a pressure suitable to be supplied to the stack at the intermediate pressure regulator 50 via the hydrogen check valves 310 and 320 and then supplied to the stack.

For example, by identifying the driving intention of the vehicle driver, the hydrogen of the volume part 3 V3 may be controlled to be used under conditions that require high output hydrogen (quick hydrogen supply).

Meanwhile, when the valve 3 230 should be opened to use the hydrogen in the volume part 3 V3, and when the difference between the pressures of the volume part 1 V1 and the volume part 2 V2 is within the predetermined allowable range after the internal pressures of the volume part 1 V1 and the volume part 2 V2 are identified, the opening rate of the valve 3 230 is adjusted so that the internal pressures of the volume part 1 V1 and the volume part 2 V2 are equal to each other, and then the valve 3 230 may be controlled to be fully opened.

FIG. 4 is a view for describing a sensor check in the apparatus for controlling a fuel tank according to an embodiment of the present disclosure.

In a determination process for selectively using the hydrogen of the volume part 1 V1, the volume part 2 V2, or the volume part 3 V3, the controller 300 may reflect the internal temperatures of the volume part 1 V1 and the volume part 2 V2 measured through the temperature sensor 1 110 or the temperature sensor 2 120.

Thus, the controller 300 needs to identify reliability of the temperature sensor 1 110 or the temperature sensor 2 120 to determine whether the measured internal temperatures of the volume part 1 V1 and the volume part 2 V2 are reliable temperatures.

For example, referring to FIG. 4, the reliability of the temperature sensor 1 110 and the temperature sensor 120 may be identified on the basis of the internal temperature of the volume part 1 V1 measured by the temperature sensor 1

110, the internal temperature of the volume part 2 V2 measured by the temperature sensor 2 120, and a reference temperature.

For reference, the reference temperature may be an average temperature of other controllers (for example, an external air temperature, a battery temperature, and the like) in the vehicle except for the chamber 100, and the temperatures measured through the temperature sensor 1 110 and the temperature sensor 2 120 should be within the reference temperature.

First, as an initial measurement R1, 22 degrees is measured by the temperature sensor 1 110, 29 degrees is measured by the temperature sensor 2 120, and 30 degrees is measured as the reference temperature.

Next, a measurement period (sampling time) is set to 10 ms, and in a second measurement R2 after 10 ms, 24 degrees is measured by the temperature sensor 1 110, 29 degrees is measured by the temperature sensor 2 120, and 31 degrees is measured as the reference temperature.

In this case, before a third measurement R3, a third prediction T3 value may be calculated through the first measurement R1 and the second measurement R2.

The third prediction T3 value may be obtained with reference to Equation 1.

$$T3=(R2*a)+R1*(1-a) \quad \text{[Equation 1]}$$

Here, "a" (smoothing constant) is between 0 and 1, and in the present disclosure, "a"=0.9.

As the third prediction T3 value, 23.8 degrees is predicted in the temperature sensor 1 110, 29 degrees is predicted in the temperature sensor 2 120, and 30.9 degrees is predicted as the reference temperature, and next, in the third measurement R3, 22 degrees is measured by the temperature sensor 1 110, 30 degrees is measured by the temperature sensor 2 120, and 32 degrees is measured as the reference temperature.

Meanwhile, a third error d3 may be calculated through a difference between the third prediction T3 value and the third measurement R3 value, and the third error d3 may be reflected to be added or subtracted when a fourth prediction T4 is calculated.

As the third error d3, an error of the temperature sensor 1 110 is calculated as 1.8 degrees, an error of the temperature sensor 2 120 is calculated as −1 degrees, and an error of the reference temperature is calculated as −1.1 degrees, and thus the fourth prediction T4 value may be reflected by adding or subtracting the third error d3 to or from the third measurement R3 value.

Thus, in the fourth prediction T4 value, the temperature sensor 1 110 may correspond to 22±1.8 degrees, the temperature sensor 2 120 may correspond to 30±1 degrees, and the reference temperature may correspond to 32±1.1 degrees.

Meanwhile, the controller 300 may identify whether the temperature measured through the temperature sensor 1 110 or the temperature sensor 2 120 is within a predetermined minimum and maximum value range at each measurement and may identify whether the temperature corresponds to a predetermined safe temperature at each measurement.

The minimum and maximum value range may be determined on the basis of a temperature value measured through the temperature sensor 1 110 or the temperature sensor 2 120 and accumulated in a database, and may be in a range of, for example, −50 degrees to 255 degrees.

The safe temperature is a temperature at which it is determined that there is a risk of explosion of hydrogen, and may be, for example, 80 degrees.

Next, when the temperature measured through the temperature sensor 1 110 or the temperature sensor 2 120 is included in a prediction range, it is determined that the temperature is a reliable temperature, and the temperature sensor 1 110 or the temperature sensor 2 120 is a reliable sensor.

However, when the temperature measured through the temperature sensor 1 110 or the temperature sensor 2 120 deviates from the prediction range, it may be identified whether the temperature corresponds to a maximum frequency range, and when the temperature corresponds to the maximum frequency range, it may be determined that the temperature value deviating from the prediction range is a reliable temperature.

However, when the temperature does not correspond to the maximum frequency range, reliability of the temperature measured through the temperature sensor 1 110 or the temperature sensor 2 120 is repeatedly identified, and thus it may be identified whether the temperature corresponds to an exception value. When the temperature corresponds to the exception value, it may be determined that the exception value is a reliable temperature.

Meanwhile, when the temperature does not correspond to the exception value after whether the temperature corresponds to the exception value is identified, since a current state may be unusual cases such as fire or explosion, it is determined that the temperature is unreliable, and thus it may be determined that an error occurs in the temperature sensor 1 110 or the temperature sensor 2 120.

Thus, since the temperature measured through the temperature sensor 1 110 or the temperature sensor 2 120 until the third measurement R3 belongs to the minimum and maximum value range, corresponds to the safe temperature, and is included in the prediction range, it is determined that the temperature is reliable, and thus it may be determined that the temperature sensor 1 110 or the temperature sensor 2 120 is a sensor having reliability.

In this way, as a $2000^{th}$ prediction T2000 value, 27.5 degrees is predicted in the temperature sensor 1 110, 30 degrees is predicted in the temperature sensor 2 120, and 37 degrees is predicted as the reference temperature, and next, in a $2000^{th}$ measurement R2000, 26 degrees is measured by the temperature sensor 1 110, 33 degrees is measured by the temperature sensor 2 120, and 35 degrees is measured as the reference temperature.

Next, since the temperature measured through the temperature sensor 1 110 or the temperature sensor 2 120 according to the $2000^{th}$ measurement R2000 satisfies the minimum and maximum value range and the safe temperature and satisfies an error range as compared with the $2000^{th}$ prediction T2000 value, it is determined that the temperature is reliable, and thus the controller 300 may determine that the temperature sensor 1 110 and the temperature sensor 2 120 are sensors having reliability.

Next, a $2000^{th}$ error d2000 calculated through a difference between the $2000^{th}$ prediction T2000 value and the $2000^{th}$ measurement R2000 value may be reflected to be added or subtracted when a $2001^{th}$ prediction T2001 value is calculated.

As the $2000^{th}$ error d2000, the error of the temperature sensor 1 110 is calculated as 1.5 degrees, the error of the temperature sensor 2 120 is calculated as −3 degrees, and the error of the reference temperature is calculated as 2 degrees, and the $2001^{th}$ prediction T2001 value may be reflected by adding or subtracting the $2000^{th}$ error d2000 to or from the 2000th measurement R2000 value.

Thus, as the 2001$^{th}$ prediction T2001 value, 26±1.5 degrees is predicted in the temperature sensor 1 110, 33±3 degrees is predicted in the temperature sensor 2 120, and 35±2 degrees is predicted as the reference temperature, and, in a 2001$^{th}$ measurement R2001, 57 degrees is measured by the temperature sensor 1 110, 32 degrees is measured by the temperature sensor 2 120, and 36 degrees is measured as the reference temperature.

57 degrees of the temperature sensor 1 110, 32 degrees of the temperature sensor 2 120, and 36 degrees of the reference temperature according to the 2001$^{th}$ measurement R2001 satisfy the minimum and maximum value range and the safe temperature. In this case, the temperature measured through the temperature sensor 2 120 and the reference temperature are measured within a range of the 2001$^{th}$ prediction T2001 value, but the temperature measured through the temperature sensor 1 110 deviates from the range of the 2001$^{th}$ prediction T2001 value.

Thus, controller 300 determines that the temperature obtained in the 2001$^{th}$ measurement R2001 through the temperature sensor 1 110 is not reliable and thus may identify whether the temperature corresponds to the maximum frequency range.

Reliability determination according to the maximum frequency range may be performed with reference to Equation 2.

$$k-a<Rn-Tn<k+a \quad \text{[Equation 2]}$$

Here, since a basic unit of the temperature sensor is 1 degree, "a" may be set to 1, and referring to FIG. 4, since a maximum frequency at which a difference between the temperature value measured through the temperature sensor 1 110 and the temperature value measured through the temperature sensor 2 120 occurs most frequently is 7, k may be set to 7.

Whether the temperature measured in the 2001$^{th}$ measurement R2001 through the temperature sensor 1 110 corresponds to the maximum frequency range may be identified with reference to Equation 3.

$$7-1<R2001-T2001<7+1 \quad \text{[Equation 3]}$$

By rearranging Equation 3, 6<30<8 may be obtained.

That is, this is a case in which, even when the temperature measured in the 2001$^{th}$ measurement R2001 through the temperature sensor 1 110 is measured to be higher than the 2001$^{th}$ prediction T2001 value by 6 to 8 degrees, the temperature satisfies the maximum frequency range, it is determined that the temperature is reliable, and thus it may be determined that the temperature sensor 1 110 is a sensor having reliability.

However, a case in which the temperature measured in the 2001$^{th}$ measurement R2001 through the temperature sensor 1 110 is higher than the 2001$^{th}$ prediction T2001 value by 30 degree corresponds to a case in which the temperature does not satisfy the maximum frequency range, it is determined that the temperature is unreliable, and the reliability of the temperature measured through the temperature sensor 1 110 may be repeatedly identified to identify whether the exception value is present.

With regard to whether the exception value is present, first, it is identified whether the temperature measured through the temperature sensor 1 110 is the safe temperature, a measurement period of the temperature sensor 1 110 is reduced from 10 ms to 1 ms, and thus real-time data may increase 10 times.

Next, even when the temperature measured through the temperature sensor 1 110 does not satisfy the maximum frequency range, when the temperature is increased and measured as in the previously measured case, it is determined that the temperature is the exception value, and thus the temperature measured through the temperature sensor 1 110 may be reliable.

However, after the reliability of the temperature measured through the temperature sensor 1 110 is repeatedly identified, when the temperature measured through the temperature sensor 1 110 does not satisfy the maximum frequency range and increases or decreases compared to the previously measured case, that is, is not constant, it is determined that the temperature is unreliable, and thus it may be determined that an error occurs in the temperature sensor 1 110.

In addition, although not illustrated in the drawings, according to embodiments, the apparatus for controlling a fuel tank may further include storage.

The storage may store a command, a control command code, control data or user data for controlling the apparatus for controlling a fuel tank. For example, the storage may include at least one of an application program, an operating system (OS), a middleware, or a device driver.

The storage may include one or more of a volatile memory and a non-volatile memory.

The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM) or the like.

The non-volatile memory may include a read only memory (ROM), a programmable ROM (PROM), an electrically programmable ROM (EPROM), an electrically erasable programmable ROM (EEPROM), a flash memory, or the like.

The storage may further include a non-volatile medium such as a hard disk drive (HDD), a solid state disk (SSD), an embedded multimedia card (eMMC), and an universal flash storage (UFS).

Hereinafter, a method of controlling a fuel tank according to another embodiment of the present disclosure will be described in detail with reference to FIGS. 5 and 6.

Figure 5:
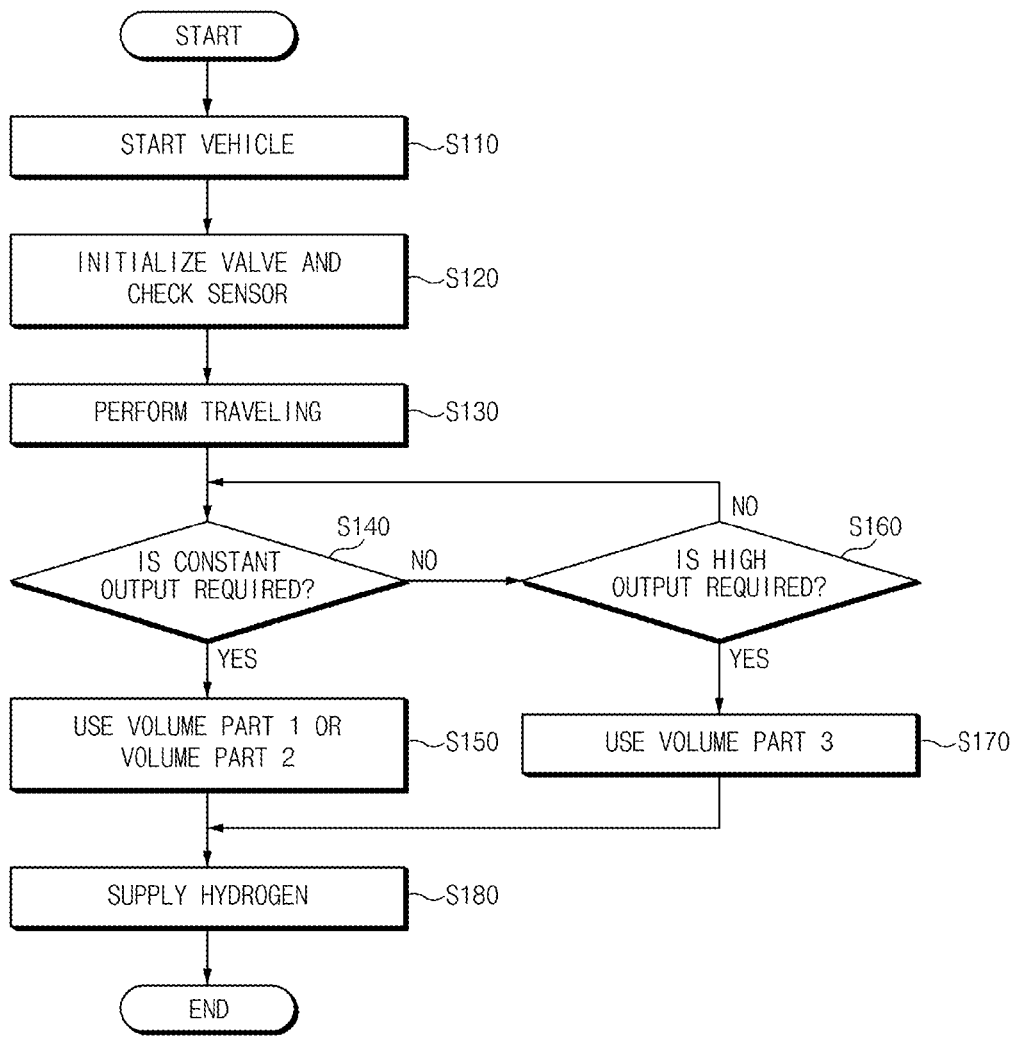
FIGS. 5 and 6 are flowcharts for describing a method of controlling a fuel tank according to an embodiment of the present disclosure.
Figure 6:
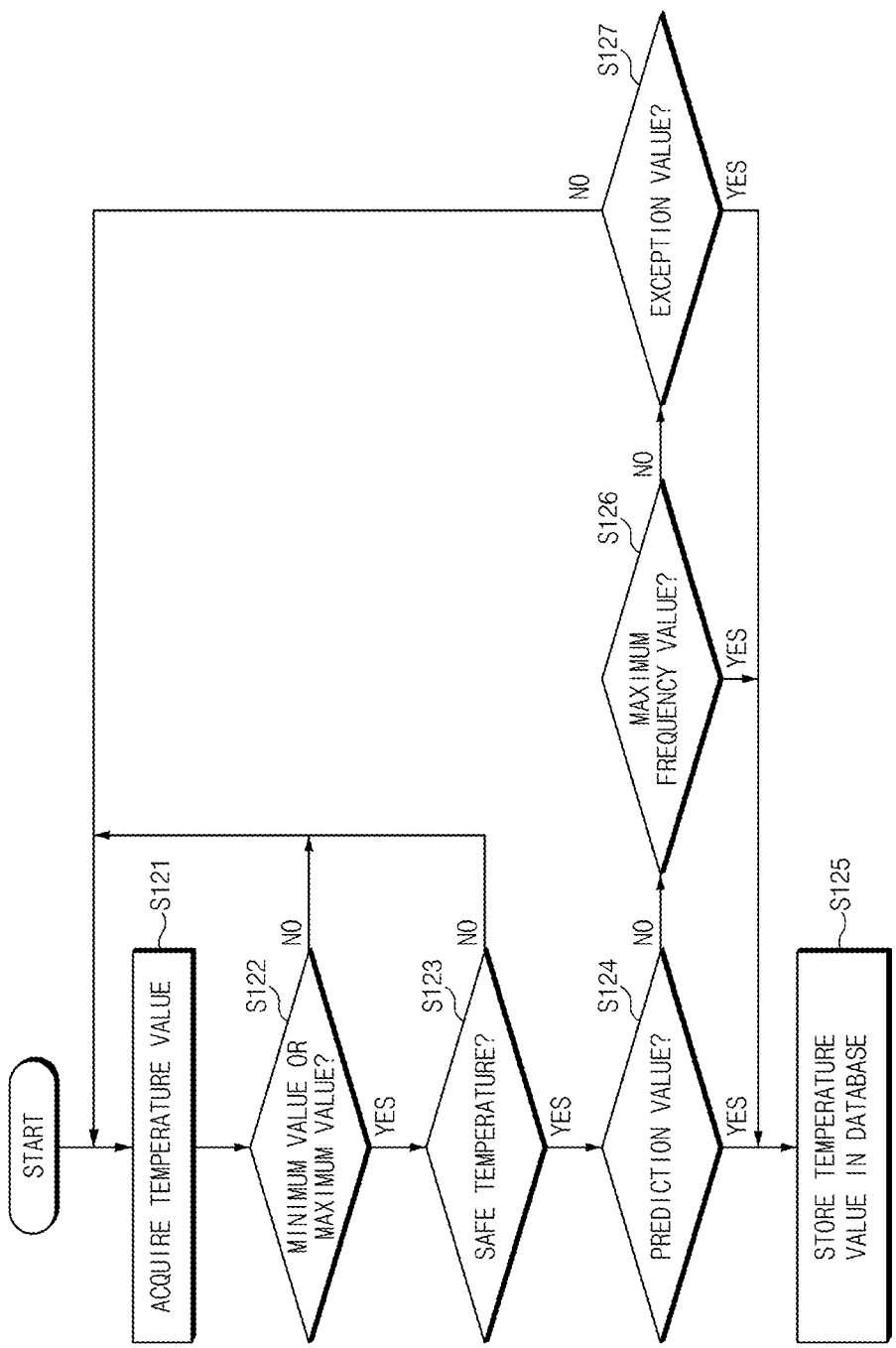

FIGS. 5 and 6 are flowcharts for describing a method of controlling a fuel tank according to an embodiment of the present disclosure.

Hereinafter, it is assumed that the apparatus for controlling a fuel tank of FIGS. 1 to 3 performs a process of FIGS. 5 and 6.

First, when a driver starts a vehicle after getting on the vehicle (S110), the controller 300 may open the valve 3 230, in a state in which the valve 1 210, the valve 2 220, and the valve 3 230 are closed, to perform adjustment so that the pressures of the volume part 1 V1 and the volume part 2 V2 become equal to each other, and may determine the reliability of the temperature sensor 1 110 and the temperature sensor 2 120 (S120).

Next, while the vehicle is traveling, the controller 300 may control opening or closing of the valve 1 210, the valve 2 220, or the valve 3 230 to select use of the hydrogen of the volume part 1 V1, the volume part 2 V2, or the volume part 3 V3 (S130).

By identifying the driving intention of the vehicle driver, the controller 300 may control the hydrogen of the volume part 1 V1 to be used under constant power and braking conditions (S140)(S150).

Next, to use the hydrogen of the volume part 1 V1, the valve 1 210 may be opened, and the valve 2 220 and the valve 3 230 may be closed, and the hydrogen of the volume part 1 V1 may be adjusted to a pressure suitable to be supplied to the stack at the intermediate pressure regulator 50 via the hydrogen check valve 1 310 and then supplied to the stack (S180).

In addition, when the hydrogen of the volume part 1 V1 is not available because of the error occurring in the volume part 1 V1, for example, an increase in the internal pressure or an increase in the internal temperature of the volume part 1 V1, the controller 300 may control the hydrogen of the volume part 2 V2 to be used.

To use the hydrogen of the volume part 2 V2, the valve 2 220 may be opened, and the valve 1 210 and the valve 3 230 may be closed, and the hydrogen of the volume part 2 V2 may be adjusted to a pressure suitable to be supplied to the stack at the intermediate pressure regulator 50 via the hydrogen check valve 2 320 and then supplied to the stack.

Meanwhile, by identifying the driving intention of the vehicle driver, the controller 300 may control the hydrogen of the volume part 3 V3 to be used under conditions (S160) that require high output hydrogen (quick hydrogen supply) (S170).

To use the hydrogen of the volume part 3 V3, the valve 1 210 and the valve 3 230 may be opened, and the valve 2 220 may be closed or the valve 2 220 and the valve 3 230 may be opened and the valve 1 210 may be closed, and the hydrogen of the volume part 3 V3 may be supplied to the stack after the pressure thereof is adjusted to a pressure at which the hydrogen may be supplied from the intermediate pressure regulator 50 via the hydrogen check valves 310 and 320 to the stack (S180).

To determine the reliability of the temperature sensor 1 110 and the temperature sensor 2 120, the controller 300 may acquire a temperature value through the temperature sensor 1 110 and the temperature sensor 2 120 (S121).

Next, the controller 300 may identify whether the temperature measured through the temperature sensor 1 110 or the temperature sensor 2 120 is within the predetermined minimum and maximum value range at each measurement (S122) and may identify whether the temperature corresponds to the predetermined safe temperature at each measurement (S123).

Next, when the temperature measured through the temperature sensor 1 110 or the temperature sensor 2 120 is included in the prediction range (S124), it is determined that the temperature is a reliable temperature so that the corresponding temperature value is stored in the database (S125), and it may be determined that the temperature sensor 1 110 or the temperature sensor 2 120 is a reliable sensor.

However, when the temperature measured through the temperature sensor 1 110 or the temperature sensor 2 120 deviates from the prediction range, it may be identified whether the temperature corresponds to a maximum frequency range (S126), and when the temperature corresponds to the maximum frequency range, it may be determined that the temperature value deviating from the prediction range is a reliable temperature.

However, when the temperature does not correspond to the maximum frequency range, reliability of the temperature measured through the temperature sensor 1 110 or the temperature sensor 2 120 is repeatedly identified, and thus it may be identified whether the temperature corresponds to an exception value (S127). When the temperature corresponds to the exception value, it may be determined that the exception value is a reliable temperature.

Meanwhile, when the temperature does not correspond to the exception value after whether the temperature corresponds to the exception value is identified, since a current state may be unusual cases such as fire or explosion, it is determined that the temperature is unreliable, and thus it may be determined that an error occurs in the temperature sensor 1 110 or the temperature sensor 2 120.

As described above, according to the present disclosure, rather than a plurality of tanks each storing hydrogen, one tank is configured as a variable volume tank having a plurality of volumes, and thus the number of parts may be reduced and ease of use may be improved. As many pressure sensors and temperature sensors as the number of volumes are provided in the one tank, and thus reliability of sensing may be improved. In a fail safety situation while using the hydrogen stored in one volume, the residual hydrogen in other volumes may be protected on the basis of valve adjustment, and thus safety may be improved.

In addition, in the case of industrial vehicles (forklift trucks, excavators, and the like), since a fuel tank accommodation space is narrower than that of a passenger car, the maximum amount of hydrogen should be secured with one fuel tank. However, when one tank is present and only one temperature sensor and only one pressure sensor are present, industrial approval of fuel cells may not be easy in terms of stability.

Accordingly, since one fuel tank has a plurality of volumes and a temperature sensor and a pressure sensor are provided at each volume, stability is improved to facilitate industrial approval of fuel cells as compared to a case in which only one temperature sensor and only one pressure sensor are provided in one fuel tank.

According to the present technology, rather than a plurality of tanks each storing hydrogen, one tank is configured as a variable volume tank having a plurality of volumes, and thus the number of parts may be reduced and ease of use may be improved. As many pressure sensors and temperature sensors as the number of volumes are provided in the one tank, and thus reliability of sensing may be improved. In a fail safety situation while using the hydrogen stored in one volume, the residual hydrogen in other volumes may be protected on the basis of valve adjustment, and thus safety may be improved.

Accordingly, in industrial vehicles (forklift trucks, excavators, and the like) having a fuel tank accommodation space that is narrower than that of passenger cars, since one tank has a plurality of volumes and a temperature sensor and a pressure sensor are provided at each volume, stability may be improved to facilitate industrial approval of fuel cells as compared to a case in which only one temperature sensor and only one pressure sensor are provided in one tank.

In addition, various effects directly or indirectly identified though the present specification may be provided.

The above description is merely illustrative of the technical spirit of the present disclosure, and those skilled in the art to which the present disclosure belongs may make various modifications and changes without departing from the essential features of the present disclosure.

Thus, the embodiments disclosed in the present disclosure are not intended to limit the technology spirit of the present disclosure but are intended to describe the present disclosure, and the scope of the technical spirit of the present disclosure is not limited by these embodiments. The scope of protection of the present disclosure should be interpreted by the scope claims, and all technical spirits within the scope equivalent thereto should be interpreted as being included in the scope of the present disclosure.

What is claimed is:

1. An apparatus for controlling a single fuel tank, the apparatus comprising: the single fuel tank having a plurality of volume parts; and a controller configured to control a charging condition of a fuel charged in the single fuel tank and to selectively control use of the fuel charged in the plurality of volume parts based on an amount of the fuel used or a state of the single fuel tank, wherein the single fuel tank includes: a chamber including a first volume part on one side and a second volume part on the other side with respect to a partition wall, opposing sides of the partition wall being in direct contact with the fuel; a first valve provided on the one side of the chamber and configured to adjust opening or closing of the first volume part; a second valve provided on the other side of the chamber and configured to adjust opening or closing of the second volume part; and a third valve provided in the partition wall and configured to adjust opening or closing for communication between the first volume part and the second volume part, and the controller controls the first valve to be opened and the second valve to be closed or controls the first valve to be closed and the second valve to be opened in a state in which the third valve is opened to charge the fuel in the single fuel tank, and the controller controls one of the first valve and the second valve to be opened, another of the first valve and the second valve to be closed, and the third valve to be opened, in response to an input to increase fuel output.

2. The apparatus of claim 1, wherein the controller controls the first valve, the second valve, and the third valve to be closed after charging the fuel in the single fuel tank.

3. The apparatus of claim 1, wherein the controller controls the third valve to be opened so that the fuel charged in the first volume part and the fuel charged in the second volume part communicate with each other.

4. The apparatus of claim 1, wherein the controller is configured to:
control the first valve to be opened and the second valve and the third valve to be closed to use the fuel charged in the first volume part;
control the first valve and the third valve to be closed and the second valve to be opened to use the fuel charged in the second volume part; and
control the first valve and the third valve to be opened and the second valve to be closed or control the second valve and the third valve to be opened and the first valve to be closed to use the fuel charged in both the first and second volume parts.

5. The apparatus of claim 1, wherein the controller controls the fuel charged in the first volume part, the second volume part, or both the first volume part and the second volume part to be selectively used based on an internal temperature value of the first volume part or an internal temperature value of the second volume part.

6. The apparatus of claim 5, wherein the controller determines whether the internal temperature value of the first volume part or the internal temperature value of the second volume part is within a predetermined minimum and maximum range, corresponds to a predetermined safe temperature value, and is within a predetermined prediction range when the fuel charged in the single fuel tank is used.

7. A method of controlling a single fuel tank, the method comprising: controlling a charging condition to charge a fuel in the single fuel tank which includes a plurality of volume parts; and selectively controlling use of the fuel charged in the plurality of volume parts based on an amount of the fuel used or a state of the single fuel tank, wherein the controlling of the charging condition of the fuel includes: adjusting opening or closing of a first volume part through a first valve provided on one side of a chamber including the first volume part on one side and a second volume part on the other side with respect to a partition wall, opposing sides of the partition wall being in direct contact with the fuel; adjusting opening or closing of the second volume part through a second valve provided on the other side of the chamber; adjusting opening or closing for communication between the first volume part and the second volume part through a third valve provided in the partition wall; and controlling the first valve to be opened and the second valve to be closed or controlling the first valve to be closed and the second valve to be opened in a state in which the third valve is opened to charge the fuel in the single fuel tank, and the method further comprises: controlling one of the first valve and the second valve to be opened, another of the first valve and the second valve to be closed, and the third valve to be opened, in response to an input to increase fuel output.

8. The method of claim 7, wherein the controlling of the charging condition of the fuel includes:
controlling the first valve, the second valve, and the third valve to be closed after charging the fuel in the single fuel tank.

9. The method of claim 7, wherein the selectively controlling of the use of the charged fuel includes:
opening the third valve so that the fuel charged in the first volume part and the fuel charged in the second volume part communicate with each other.

10. The method of claim 7, wherein the selectively controlling of the use of the charged fuel includes:
controlling the first valve to be opened and the second valve and the third valve to be closed to use the fuel charged in the first volume part;
controlling the first valve and the third valve to be closed and the second valve to be opened to use the fuel charged in the second volume part; and
controlling the first valve and the third valve to be opened and the second valve to be closed or controlling the second valve and the third valve to be opened and the first valve to be closed to use the fuel charged in both the first and second volume parts.

11. The method of claim 7, wherein the selectively controlling of the use of the charged fuel includes:
controlling the fuel charged in the first volume part, the second volume part, or both the first and second volume parts to be selectively used based on an internal temperature value of the first volume part or an internal temperature value of the second volume part.

12. The method of claim 11, wherein the selectively controlling of the use of the charged fuel includes:
determining whether the internal temperature value of the first volume part or the internal temperature value of the second volume part is within a predetermined minimum and maximum range, corresponds to a predetermined safe temperature value, and a predetermined prediction value range when the fuel charged in the single fuel tank is used.

\* \* \* \* \*